UNITED STATES PATENT OFFICE.

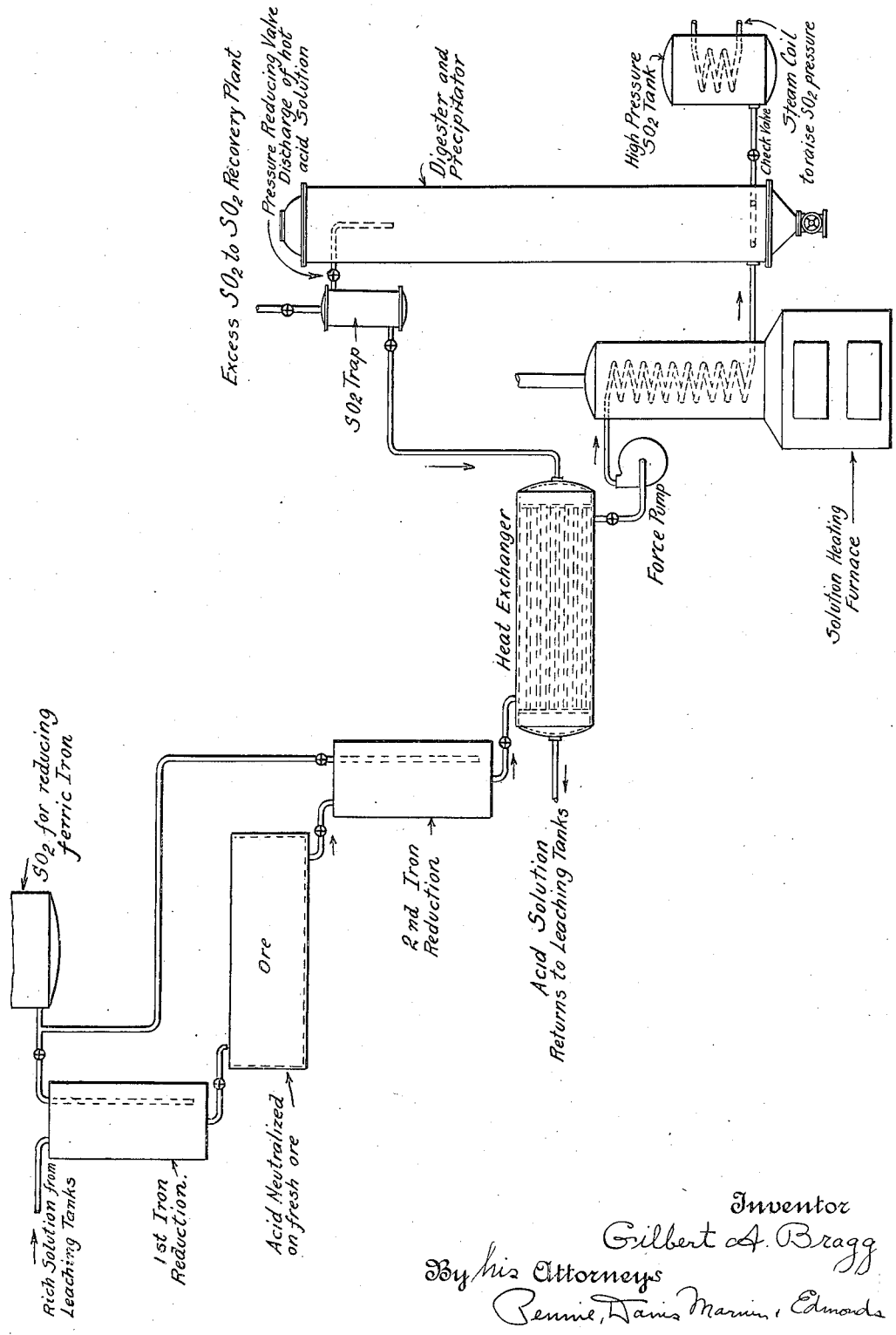

GILBERT A. BRAGG, OF THOMSON, NEVADA, ASSIGNOR TO METALS RESEARCH COMPANY, A CORPORATION OF MAINE.

HYDROMETALLURGY OF COPPER.

1,395,755.  Specification of Letters Patent.  Patented Nov. 1, 1921.

Application filed August 16, 1920. Serial No. 403,761.

*To all whom it may concern:*

Be it known that I, GILBERT A. BRAGG, a citizen of the United States, residing at Thomson, in the county of Lyon, State of Nevada, have invented certain new and useful Improvements in Hydrometallurgy of Copper; and I do hereby declare the following to be a full, clear, and exact description of the invention, such as will enable others skilled in the art to which it appertains to make and use the same.

The present invention relates to the hydrometallurgy of copper, and, in particular, involves the recovery or extraction of copper in the wet way from ores, roasted matte, or other copper-bearing material in accordance with the reversible reaction:

$$CuSO_4 + SO_2 + 2H_2O = Cu + 2H_2SO_4$$

The invention has for its object the provision of certain improvements in the extraction of copper by processes involving in principle the foregoing reaction, and more specifically the invention contemplates certain improvements in the precipitation of copper from a leached copper sulfate solution by means of sulfur dioxid.

The reversible reaction above mentioned forms the general basis for one method of hydrometallurgically extracting copper from its ores, roasted copper matte, and other copper-bearing material. As heretofore customarily practised, this method consists generally in leaching the copper-bearing material with sulfuric acid to obtain a leached copper sulfate solution. Sulfur dioxid from any suitable source is then dissolved in the leached copper sulfate solution, whereupon the solution, containing the dissolved sulfur dioxid, is heated under pressure to precipitate copper.

In carrying out the process in the heretofore customary manner as described in the preceding paragraph, I have found that a large portion of the precipitated copper always adheres to the walls of the vessel in which the leached copper sulfate solution (containing the dissolved sulfur dioxid) is heated. I have found in practice that this adherence of the precipitated copper to the walls of the vessel is especially pronounced on those portions of the vessel walls through which the heat, necessary to raise the temperature of the solution for effecting satisfactory precipitation of the copper, is conducted. This adherence of copper to the walls of the precipitating vessel is objectionable since it renders difficult the removal of the copper from the precipitating vessel, and, moreover, rapidly lowers the rate at which heat may be conducted into the solutions through the vessel walls.

I have discovered that the foregoing objection is overcome to a very large extent by introducing sulfur dioxid into a copper sulfate solution already heated to the necessary temperature for effecting precipitation of the copper, as distinguished from the heretofore customary practice of dissolving sulfur dioxid in a cold copper sulfate solution and then heating the resulting solution to the necessary temperature for effecting precipitation of the copper. Thus, in accordance with my present invention, I first obtain a suitable copper sulfate solution, in whatever way is best suited for the particular ore or other copper bearing material under treatment. I next heat this solution to the proper temperature and pressure for the subsequent precipitation of the copper before introducing into the solution the sulfur dioxid for the precipitation of the copper. The copper sulfate solution may be heated in one vessel and conducted to another vessel before introducing the sulfur dioxid therein or the sulfur dioxid may be introduced into the solution in the same vessel in which the solution is heated. The solution under treatment may pass continuously through the vessel or vessels in which the heating and precipitating operations take place or the solution may be intermittently treated in batches.

The sulfur dioxid may be introduced into the hot copper sulfate solution in any suitable manner, either continuously or intermittently. The method of introduction which I have found most satisfactory in practice is to introduce the sulfur dioxid as a pure gas near the bottom of the vessel in which the precipitation of the copper is to take place. As the bubbles of sulfur dioxid gas rise through the copper sulfate solution, which has been previously heated in accordance with the present invention to the proper temperature and pressure, they are absorbed by the solution and take part in the reaction involved in the precipitation of copper from the solution. This pure sulfur dioxid gas may most conveniently be obtained from liquid sulfur dioxid, although not necessarily so, and the gas may conveniently be had under the pressure necessary to force it into the copper sulfate solution by appropriately warming the liquid sulfur dioxid contained in a suitable closed vessel.

The precipitation of copper from copper sulfate solutions is very materially improved by carrying out the precipitation in accordance with the method of the invention. The amount of the precipitated copper which adheres to the walls of the precipitating vessel is rendered practically insignificant by the practice of the invention. Moreover, in practising the invention, it is possible to conduct the heating and precipitating operations in separate vessels, thus removing any possibility of the precipitated copper adhering to surfaces to which heat is applied.

The copper sulfate solution obtained from the leaching of many ores met in practice contains small amounts of ferric iron in solution. For example, the leached copper sulfate solution may contain 0.2%, or thereabout, of ferric iron which attacks any copper, brass or bronze apparatus with which the solution comes in contact. In the heretofore customary practice, the sulfur dioxid when introduced into the cold copper sulfate solution reduces the ferric iron to the ferrous condition, in which latter condition the iron is innocuous. In carrying out the improvements of the present invention, I have found in treating a leached copper sulfate solution containing ferric iron, that the ferric iron may be reduced to the ferrous condition by preliminarily treating the cold solution with sulfur dioxid in sufficient amount to reduce the ferric iron contained in this solution to ferrous iron but in insufficient amount to effect any appreciable precipitation of copper from the solution.

I prefer that the copper sulfate solution, when prepared for the precipitation of the copper by sulfur dioxid, should contain not to exceed 2 grams per liter of free sulfuric acid. If the free sulfuric acid content of the copper sulfate solution exceeds about 2 grams per liter, I prefer to neutralize such excess of free sulfuric acid in any appropriate manner. Where ferric iron is reduced to ferrous iron in the manner hereinbefore described, some free sulfuric acid results, and in such cases, I prefer to neutralize the resulting solution until the amount of sulfuric acid present is not in excess of 2 grams per liter. Where this neutralization of the excess sulfuric acid oxidizes any of the ferrous iron in the solution to ferric iron, I next introduce into the solution substantially the required amount of sulfur dioxid to reduce to ferrous iron any ferric iron resulting from the aforementioned neutralization step.

The following example will serve as a specific illustration of the method of carrying out the improvements of the present invention in practice. The copper sulfate solution is prepared in any appropriate manner by leaching the copper ore, concentrate or other suitable copper-bearing material. I have secured excellent results with a copper sulfate leach liquor containing 35 grams of copper per liter and not to exceed 2 grams per liter of free sulfuric acid. If the solution, as it comes from the leaching vat, contains any ferric iron, this should be reduced to the ferrous condition before the solution is handled in copper or bronze apparatus. I prefer to reduce this ferric iron by adding to the solution sulfur dioxid either as a gas or as a liquid, but preferably as a liquid, since the operation is more expeditiously performed in that case. Sufficient sulfur dioxid is added to the solution to reduce all of the ferric iron in accordance with the following equation:

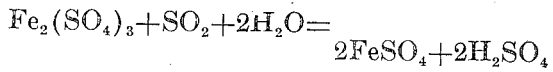

$$Fe_2(SO_4)_3 + SO_2 + 2H_2O = 2FeSO_4 + 2H_2SO_4$$

The above reaction is not instantaneously completed, but will be found to be finished after the solution has stood 4 or 5 hours. Since some sulfuric acid is formed by this reduction and free sulfuric acid interferes with the reaction, I prefer to neutralize this acid by passing the solution through fresh ore, whereby the excess sulfuric acid is neutralized by dissolving copper from the ore. In this manner, the free acid in the solution is again reduced to less than 2 grams per liter. At the same time, a small additional quantity of iron may be dissolved from the ore as ferric iron. If such is the case, before subjecting the neutralized solution to the precipitation treatment, sulfur dioxid is added thereto in just sufficient amount to reduce the ferric iron to ferrous iron. The copper sulfate solution thus prepared is now ready to be heated preparatory to the introduction therein of sulfur dioxid for the precipitation of the copper. The solution may be handled in copper, bronze or brass pipe or apparatus without corroding the same.

The copper sulfate solution is now heated to a temperature of about 160°C. at which temperature the steam pressure is about 75 pounds per square inch. After the solution has been heated to this temperature, sulfur dioxid gas is forced into the solution until the combined pressure of the steam and sulfur dioxid is 120 pounds per square inch. The solution is maintained at this temperature, with the addition of such further amount of sulfur dioxid as may be necessary to maintain the pressure at 120 pounds, for 2 hours. Sulfur dioxid at the pressure necessary to force it into the heated solution (150 pounds pressure is sufficient) is obtained by warming the pure liquid sulfur dioxid, confined in a heavy steel tank, to a temperature of 60° C. At this temperature, the vapor pressure of the liquid sulfur dioxid is about 150 pounds per square inch. At the end of 2 hours, the liquor is drawn from the precipitating tank and subjected to filtration for the separation of the precipitated copper therefrom. The residual liquor from the filtering operation will usually contain about 10 grams of copper per liter and about 75–80 grams per liter of free sulfuric acid will have been formed in it by the precipitation of the copper and the oxidation of the sulfur dioxid.

This residual liquor is available for the treatment of fresh copper-bearing material, as will be well understood by those skilled in the art.

In accordance with the heretofore customary practice, the sulfur dioxid for the precipitation of the copper is dissolved in the neutralized leach liquor at atmospheric temperature and pressure, and the resulting mixture is then heated to a temperature of about 160° C. Where equal quantities, by weight, of copper and sulfur dioxid are present in the solution before heating the same, the pressure will never reach 120 pounds per square inch, because much of the sulfur dioxid will react with the solution during the process of heating. In accordance with the improvements of my present invention, it is possible to maintain a higher concentration of sulfur dioxid in contact with the solution to be precipitated, which increases the quantity of copper precipitated per unit of solution heated.

The method of the invention moreover obviates the necessity of handling a leach solution heavily charged with sulfur dioxid. In such a solution, there is always some loss of sulfur dioxid by evaporation and some by oxidation. Since, in accordance with the present invention, the sulfur dioxid is not added to the solution until the latter is heated to the proper temperature for the precipitation of the copper, both of these losses are avoided.

Since, in the practice of the present invention, no sulfur dioxid available for the precipitation of copper is added to the copper sulfate solution until it is heated to the necessary precipitating temperature, there is no precipitation of copper during the heating and the solution may be transferred to a second vessel, still at the proper temperature and pressure for the precipitation of the copper, before adding the sulfur dioxid. The precipitated copper always adheres more firmly to a heated surface (that is, one whose temperature is above that of the surrounding liquor) than to one at the temperature of the liquor. By transferring the heated solution to a second vessel, much less of the precipitated copper adheres to the walls of the vessel and such copper as does adhere is much less firmly attached to the walls than if the precipitation of the previously charged liquor takes place in the vessel in which it is heated, where there is ample opportunity for the precipitated copper to attach itself to heated surfaces.

In carrying out the improvements of the invention, the concentration of the copper in the solution may be less than 35 grams per liter and the solution may contain more than 2 grams of free sulfuric acid per liter. Moreover, the temperature of the solution need not be about 160° C., nor is it necessary that the combined steam and sulfur dioxid pressure be about 120 pounds per square inch. Each and all of the above mentioned factors may vary within fairly wide limits, and the figures which I have specifically mentioned are to be understood as representing what I have found to be preferred practice. Where, for any reason, it is not practicable to prepare a solution containing 35 grams per liter of copper, it is still preferable to heat the solution to about 160° C., and not to have in excess of 2 grams per liter of free sulfuric acid in the solution when it is finally prepared for precipitation. The less copper there is in the solution heated for precipitation, the less copper and acid will there be in the residual liquor after the precipitation treatment. Where the solution contains more than 2 grams per liter of free sulfuric acid, there will be relatively less copper precipitated. If the solution is heated to a higher temperature than about 160° C. or if the combined steam and sulfur dioxid pressure is maintained higher than about 120 pounds per square inch, relatively more copper will be precipitated. In general, higher temperatures and higher pressures involve greater cost and the additional copper precipitated does not compensate for this increased cost.

In the accompanying drawing, there is represented a flow-sheet for carrying out the invention. Appropriate legends have been applied to the drawing to designate the various pieces of apparatus represented in the flow-sheet, and the arrangement and operation of the installation represented by the flow-sheet will be clearly understood by those skilled in the art from the foregoing description of the invention.

I claim :—

1. The method of extracting copper from ores, roasted matte, or other copper-bearing material, which comprises leaching the material to obtain a copper sulfate solution, heating the copper sulfate solution, and introducing sulfur dioxid into the heated copper sulfate solution; substantially as described.

2. The method of extracting copper from ores, roasted matte, or other copper-bearing material, which comprises leaching the material to obtain a copper sulfate solution, reducing any ferric iron contained in said solution to ferrous iron, heating the thus treated copper sulfate solution, and introducing sulfur dioxid into the heated copper sulfate solution; substantially as described.

3. The method of extracting copper from ores, roasted matte, or other copper-bearing material, which comprises leaching the material to obtain a copper sulfate solution, treating said solution with sulfur dioxid in sufficient amount to reduce to ferrous iron any ferric iron contained in the solution but in insufficient amount to effect any appreciable precipitation of copper from the solution, heating the thus-treated copper sulfate solution, and introducing sulfur dioxid into the heated copper sulfate solution; substantially as described.

4. The method of extracting copper from ores, roasted matte, or other copper-bearing material, which comprises leaching the material to obtain a copper sulfate solution, treating said solution with sulfur dioxid in sufficient amount to reduce to ferrous iron any ferric iron contained in said solution but in insufficient amount to effect any appreciable precipitation of copper from the solution, neutralizing the free sulfuric acid in the thus-treated solution until the solution contains not to exceed 2 grams per liter of free sulfuric acid, heating the resulting copper sulfate solution, and introducing sulfur dioxid into the heated copper sulfate solution; substantially as described.

5. The method of extracting copper from ores, roasted matte, or other copper-bearing material, which comprises leaching the material to obtain a copper sulfate solution, treating said solution with sulfur dioxid in sufficient amount to reduce to ferrous iron any ferric iron contained in said solution but in insufficient amount to effect any appreciable precipitation of copper from the solution, neutralizing the free sulfuric acid in the thus-treated solution until the solution contains not to exceed 2 grams per liter of free sulfuric acid, treating the thus neutralized solution with sulfur dioxid in substantially the required amount to reduce to ferrous iron any ferric iron formed during said neutralizing step, heating the thus prepared copper sulfate solution, and introducing sulfur dioxid into such heated copper sulfate solution; substantially as described.

6. The method of extracting copper from ores, roasted matte, or other copper-bearing material, which comprises leaching the material to obtain a copper sulfate solution, heating the copper sulfate solution to an appropriate temperature for the subsequent precipitation of copper therefrom by sulfur dioxid, and introducing sulfur dioxid into such heated copper sulfate solution and thereby effecting precipitation of the copper from the solution to the desired extent; substantially as described.

7. The method of extracting copper from ores, roasted matte, or other copper-bearing material, which comprises leaching the material to obtain a copper sulfate solution, heating the copper sulfate solution to a temperature of approximately 160° C., and introducing sulfur dioxid into such heated copper sulfate solution; substantially as described.

8. The method of extracting copper from ores, roasted matte, or other copper-bearing material, which comprises leaching the material to obtain a copper sulfate solution containing not to exceed 2 grams per liter of free sulfuric acid, heating the copper sulfate solution to an appropriate temperature for the subsequent precipitation of copper therefrom by sulfur dioxid, and introducing sulfur dioxid into such heated copper sulfate solution; substantially as described.

9. The method of extracting copper from ores, roasted matte, or other copper-bearing material, which comprises leaching the material to obtain a copper sulfate solution, heating the copper sulfate solution to an appropriate temperature for subsequently precipitating copper therefrom by sulfur dioxid, and introducing sulfur dioxid into said heated solution by heating liquid sulfur dioxid to such a temperature that its vapor pressure exceeds the pressure under which said heated solution is confined; substantially as described.

In testimony whereof I affix my signature.

GILBERT A. BRAGG.